Feb. 24, 1959   E. H. CABANISS   2,875,400
FUNCTION GENERATING CIRCUIT FOR OBTAINING SQUARES OF INPUTS
Filed March 11, 1954
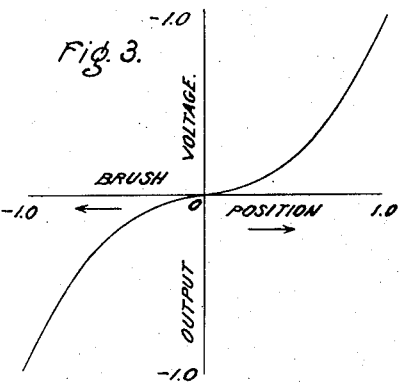
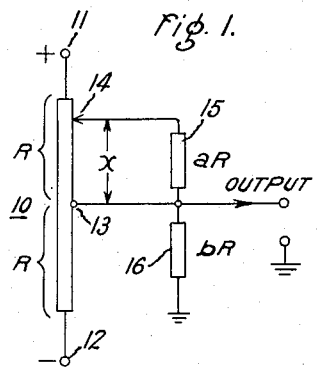
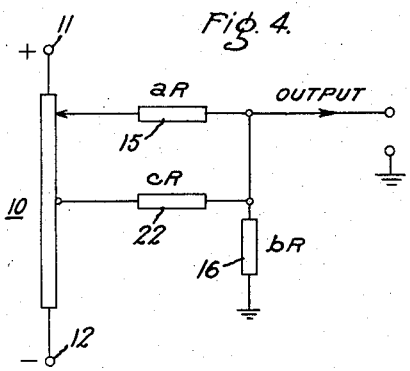
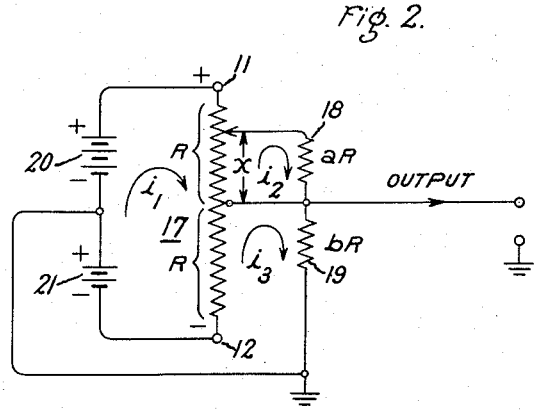
INVENTOR:
Edward H. Cabaniss,
BY
His Attorney.

United States Patent Office 2,875,400
Patented Feb. 24, 1959

2,875,400

FUNCTION GENERATING CIRCUIT FOR OBTAINING SQUARES OF INPUTS

Edward H. Cabaniss, Schenectady, N. Y., assignor to General Electric Company, a corporation of New York Application March 11, 1954, Serial No. 415,660

5 Claims. (Cl. 323—74)

This invention generally relates to analog computing circuits for gun fire control systems or the like, and more particularly to devices for generating an electrical signal having an output following a predetermined non-linear mathematical function of its input.

Heretofore network computing circuits for generating an electrical signal proportional to the square of the displacement of a shaft have employed either non-linearly wound potentiometers or two linearly wound potentiometers electrically interconnected and having the movable wipers or brushes thereof mechanically ganged for simultaneous displacement. Non-linear resistors for this purpose are relatively unsatisfactory requiring specially constructed winding machines for variably winding the resistance wire in a path along or about the central wiper connection; and they are additionally electrically unsatisfactory since the resistance variation near the origin cannot be made zero due to finite resistance of the wire. The ganged linear potentiometers employed for this purpose also possess disadvantages for they require a duplicate potentiometer winding and a mechanical linkage for interconnecting the brushes of the two windings.

In accordance with the present invention a much simpler function generating circuit of this type is provided employing but a single linearly variable impedance uniquely connected in a circuit network with two additional fixed linear impedances. By employing but a single linearly variable impedance, the network of the present invention provides a smooth variation of the generated function. Moreover, by selecting different values for the additional fixed impedances, the present invention permits the resulting waveform of the generated voltage to be varied.

In accordance with a second embodiment of this invention, a fourth impedance may be added to the basic circuit of this invention for controlling the slope of the generated function near the zero displacement position while substantially unaffecting other portions of the generated waveform. Consequently, the present invention provides a function generating network of greater versatility than the prior known devices.

It is accordingly one object of the present invention to provide an electrical circuit comprised of linear components for generating a non-linear function of a mechanically entered input.

Another object of the invention is to provide a circuit for electrically computing the square of the angle of rotation of a shaft and the direction thereof.

A further object of the invention is to provide a non-linear function generator that is both simpler and less expensive than the prior devices.

A still further object of this invention is to provide an electrical circuit for generating a non-linear function of a mechanical input whose waveform may be readily and simply varied.

Other objects and many attendant advantages of this invention will be more readily comprehended to those skilled in this art upon a consideration of the following detail description of two embodiments of the invention taken in conjunction with the accompanying drawings wherein:

Fig. 1 is a schematic electrical diagram illustrating one embodiment of the invention;

Fig. 2 is an electrical wiring diagram of the circuit of Fig. 1;

Fig. 3 is a plotted graph depicting the desired mathematical function generated by the circuit of Fig. 2; and Fig. 4 is a diagram similar to Fig. 1 depicting a second embodiment of the invention.

Referring now to Fig. 1 for a detail consideration of the present invention, a single electrical impedance 10, preferably a potentiometer, is provided having an upper fixed terminal 11 at one end thereof, a lower fixed terminal 12 at the opposite end thereof, a fixed terminal 13 dividing the impedance into two sections, and a movable wiper or brush 14 adapted to slidably traverse the full length of the impedance between the fixed terminals 11 and 12 and thereby select any proportional value thereof. Electrically connected between the slidable terminal 14 and tap 13 is a first fixed impedance generally designated 15, and further interconnecting this tap and ground is a second fixed impedance generally designated 16. A positive voltage source (not shown) energizes upper terminal 11 of variable impedance 10 and a negative voltage source of equal value (not shown) is connected to energize the lower terminal 12 thereof. Thus, positioning slider 14 over any portions of impedance 10 that are intermediate fixed terminal 11 and tap 13 provides a positive potential at the junctions of fixed impedances 15 and 16, and positioning slider 14 along the lower portion of the impedance between tap 13 and lower fixed terminal 12 provides a negative voltage at this junction.

To facilitate a thorough understanding of the invention, a brief mathematical analysis of this circuit, employing Kirchhoff's law is given with reference to Fig. 2 wherein impedance 10 is shown as a resistance potentiometer 17 having a center tap 13, fixed impedance 15 as a fixed resistance 18, fixed impedance 16 as a fixed resistance 19, and two equal value direct current voltage sources 20 and 21 as the positive and negative sources across potentiometer 17.

Assuming the values of these components and the voltage sources to be:

$+E=$ the voltage of positive source 20.

$-E=$ the voltage of negative source 21.

$R=$ one-half the resistance of the potentiometer winding 17, or the resistance of each section thereof intermediate the fixed terminal and the center tap.

$aR=$ the resistance value of resistor 18, where $a$ is a constant which may be greater than or less than one.

$bR=$ the resistance value of resistor 19 where $b$ is a constant which may be either greater or less than one.

$X=$ the proportion of resistance $R$ selected by slider 14 intermediate the slider 14 and the center tap 13, and variable from $+1$ to zero to $-1$.

Then referring to Fig. 2, it is observed that three current loops are present in this network, and by Kirchhoff's law the voltage-current equation for these loops may be formulated as:

$$2E = 2Ri_1 - XRi_2 - Ri_3$$
$$0 = -XRi_1 + (aR + XR)i_2 + 0$$
$$-E = -Ri_1 + (bR + R)i_3$$

Solving these equations to determine the ratio of $$\frac{i_3 bR}{E} \text{ or } \frac{e_{output}}{E}$$

it is observed that:

$$\frac{e_o}{E} = \frac{b|X|X}{(2b+1)(a+|X|) - (b+1)X^2}$$

where $|X|$ signifies the absolute magnitude of X which does not change in polarity as slider 14 traverses the negative or lower portion of potentiometer 17 between center tap 13 and terminal 12.

Considering this equation, it is noted that the $X^2$ term in the denominator is substantially negligible since X is always 1 or less than 1 and the square thereof is accordingly small. Therefore, since the magnitude of the numerator is directly proportional to $X^2$ and the denominator is dominated by the constants $a$ and $b$, the magnitude of the output voltage $e_{output}$ is substantially proportional to the square of the displacement (X) of potentiometer brush 14. Moreover, it is noted that since the term $|X|$ in the numerator is absolute and not dependent upon sign or direction of displacement, whereas the second term X is so dependent, a displacement of brush 14 in the negative direction (−X) reverses the polarity of this output voltage.

These characteristics of this circuit are graphically depicted by Fig. 3, illustrating the waveform of the voltage output as the brush position is continuously varied over the potentiometer from the positively energized terminal 11 to the negatively energized terminal 12. It is observed that with the brush positioned at center tap 13, the voltage output is 0. However, as the brush is moved upwardly toward positively energized terminal, this voltage rapidly increases in the positive direction as a power function of the input displacement. Conversely, as the brush is moved downwardly from center tap 13 toward negative energized terminal 12, the voltage reverses in polarity, becoming negative, and thence rapidly increases in this negative direction again approximating the square of this displacement.

Referring again to Fig. 3 and to the above equation relating output voltage thereof to input displacement, it may be readily determined mathematically that the slope or rate of change of output voltage becomes substantially zero (0) as the displacement of brush 14 approaches center tap 13. This condition is readily understandable considering that this circuit generates a signal closely approximating the square of brush displacement, and the slope or rate of change of a true function varying as $X^2$ becomes zero as the term X approaches zero.

In some applications, such as the control of motor speed, however, a more rapid change of voltage near the zero position is desired. Due to the particular versatility of this circuit, such a change may be easily made by merely inserting an additional impedance 22 intermediate the junction of impedances 15 and 16, and center tap 13 as depicted by Fig. 4.

An analysis of the circuit of Fig. 4 by Kirchhoff's law yields the following loop equations:

$$2E = 2Ri_1 - XRi_2 - Ri_3$$
$$0 = -XRi_1 + i_2 R(a+c+X) - i_3 cR$$
$$-E = -i_1 R - i_2 cR + i_3 R(1+b+c)$$

which when solved related the output $e_o$ to the energizing source E as:

$$\frac{e_o}{E} = \frac{2bX(2c+|X|)}{(1+2b+2c)(2a+2c+2|X|-X^2) - (2c+|X|)^2}$$

Observing this latter equation it is noted that the numerator in this instance has a term proportional to X and a second term proportional to $X^2$. This first term, therefore, connotes that the generated function increases proportionally with X and has a substantially constant slope or rate of change where the value of X is small. On the other hand, as the value of X becomes larger, the $X^2$ term in the numerator predominates, resulting in the generated function rapidly increasing with X and approximating the square of this displacement. Consequently, this equation mathematically illustrates that the addition of impedance 22 permits the voltage generated by this circuit to follow a power function of the larger brush displacements, to reverse polarity as the brush passes through the zero or center tap position, and to provide a large voltage output for small displacements of the brush from this zero position.

Although the above embodiments of the invention have been disclosed as incorporating linear resistors and linear center tapped potentiometers energized by direct current sources for generating a symmetrically reversible non-linear function with displacement of the wiper from the center tap, it is contemplated that linear impedances of other types may be employed and energized by alternating current sources. Similarly, non-symmetrical variations of the function about the origin may obviously be obtained by placing the fix tap 13 of the variable impedance at other than the center position. Moreover, the function generated by these networks may be further varied, as desired, to produce waveforms other than the square of the input by changing the relative values of the two or three fixed impedances.

Since these and many other variations to the specific circuitry illustrated and described may be readily made by those skilled in the art without departing from the spirit and scope of the invention, this invention is to be considered as limited only in accordance with the features thereof as set forth in the claims appended hereto.

What I claim as new and desire to secure by Letters Patent of the United States is:

1. In a linear impedance network for generating an electrical power function of a mechanical input signal, a linearly variable potential divider impedance having one fixed terminal adapted to be energized by a potential source of one polarity one side of which is grounded, a second fixed terminal adapted to be energized by an equal potential source of the opposite polarity one side of which is grounded, a movable terminal slidable over said impedance intermediate said fixed terminals, and a third fixed terminal electrically separating the impedance in two sections, a second linear impedance connected intermediate said movable terminal and third terminal, and a third linear impedance interconnecting said third terminal and ground, whereby the displacement of said movable terminal from said third terminal toward said first terminal provides a voltage between ground and the third terminal that varies as a power function of said displacement, and displacement of said movable terminal from said third terminal toward said second terminal a like distance provides an equal voltage of the opposite polarity.

2. A non-linear function generating electrical network including a linearly wound potentiometer energizable at one terminal thereof by a potential of one polarity and at the opposite terminal thereof by an equal potential of the opposite polarity, each of said potentials having one side grounded, said network having a fixed terminal electrically separating the potentiometer winding and a movable tap slidable intermediate said end terminals, a first linear resistance electrically connecting said fixed terminal and movable tap, and a second linear resistor electrically interconnecting a ground connection and said fixed terminal, whereby a displacement of said brush from said fixed terminal toward one end terminal provides between said fixed terminal and ground a voltage of one polarity that is non-linearly proportional to said displacement, and a displacement of said brush a like distance from the fixed terminal toward the opposite end terminal provides an equal voltage of the opposite polarity.

3. In an electrical network for generating a power function of a mechanical input signal, a linearly wound potentiometer energizable at one end terminal thereof by a potential of one polarity and at the opposite terminal thereof by an equal potential of the opposite polarity, each of said potentials having one side grounded, said network having a center terminal equally dividing the potentiometer winding and a movable tap slidable intermediate said end terminals, a first linear resistor electrically connecting said movable tap and an output connection, a second linear resistor electrically connecting said output connection and a ground connection, and a resistance means electrically connecting said center terminal and said output connection, whereby a displacement of said tap from the center terminal toward one end terminal provides between ground and said center terminal a voltage of one polarity non-linearly proportional to said displacement, and a displacement of said tap a like distance from the center tap toward the opposite end terminal provides an equal voltage of the opposite polarity, and the rate of change of output voltage with variation of said tap away from the center terminal is in proportion to the value of said resistance means.

4. An electrical network for generating a power function comprising a linearly variable potential divider impedance having one fixed terminal adapted to be energized by a potential source of one polarity one side of which is grounded, a second fixed terminal adapted to be energized by an equal potential source of the opposite polarity one side of which is grounded, a movable terminal slidable over said impedance intermediate said fixed terminals, and a third fixed terminal equally dividing the impedance in two equal sections, an electrical connection having one terminal connected to the third fixed terminal, a second linear impedance electrically interconnecting said movable terminal and the other terminal of said electrical connection, and a third linear impedance electrically interconnecting said other terminal of said electrical connection and ground, whereby a displacement of said brush from the center tap toward one end terminal provides between ground and said center tap a voltage of one polarity proportional to a power function of said displacement, and a displacement of said brush from the center tap toward the opposite end terminal a like distance provides an equal voltage of the opposite polarity.

5. In an electrical network for generating a power function of a mechanical input signal, wherein the generated signal approaches zero as the mechanically generated input signal approaches zero, a potentiometer adapted to be energized at one terminal thereof by a source of voltage one side of which is adapted to be grounded, and adapted to be energized at the opposite terminal thereof by an opposite polarity source of voltage having an equal magnitude and having one terminal thereof adapted to be grounded, said potentiometer having a constant resistance per turn, having a center tap equally dividing the potentiometer winding into two equal parts, and having a wiper for traversing the potentiometer windings intermediate said fixed terminals, a first linear resistor electrically interconnecting said wiper and an electrical junction, a second linear resistor electrically interconnecting the fixed electrical junction and said ground connection, and a third electrical resistor interconnecting said electrical junction and said potentiometer center tap, whereby displacement of said wiper intermediate the potentiometer center tap and positively energized terminal provides an electrical signal of one polarity at the electrical junction non-linearly proportional to said displacement, and displacement of said potentiometer wiper intermediate the potentiometer center tap and the opposite terminal thereof provides a similarly variable electrical signal of the opposite polarity.

References Cited in the file of this patent

UNITED STATES PATENTS 2,693,031  Clark        Nov. 2, 1954

OTHER REFERENCES

Levenstein: "Generating Non Linear Functions With Linear Potentiometer," Tele-Tech and Electronic Industries, October 1953, pages 76–78.

Waveforms (Chance), 1949, page 438, Electronic Analog Computer, 1952, pages 256 and 257.